United States Patent
Ota

(10) Patent No.: US 11,775,232 B2
(45) Date of Patent: Oct. 3, 2023

(54) PRINTER AND PRINTING SYSTEM FOR REPRINTING LOW QUALITY IMAGE AND MARKING DISCARD IMAGES

(71) Applicant: BROTHER KOGYO KABUSHIKI KAISHA, Nagoya (JP)

(72) Inventor: Shoko Ota, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/709,901

(22) Filed: Mar. 31, 2022

(65) Prior Publication Data

US 2022/0317946 A1    Oct. 6, 2022

(30) Foreign Application Priority Data

Mar. 31, 2021 (JP) ................. 2021-061651

(51) Int. Cl.
*G06F 11/07* (2006.01)
*G06F 3/12* (2006.01)
*H04N 1/00* (2006.01)

(52) U.S. Cl.
CPC ............ *G06F 3/1208* (2013.01); *G06F 3/121* (2013.01); *G06F 3/1234* (2013.01); *G06F 3/1282* (2013.01); *H04N 1/00801* (2013.01)

(58) Field of Classification Search
CPC .... G06F 3/1208; G06F 3/1234; G06F 3/1282; G06F 3/1243; G06F 3/1251; H04N 1/00665
USPC ....... 358/1.15, 1.6, 3.24, 1.18, 504; 382/112
See application file for complete search history.

(56) References Cited

U.S. PATENT DOCUMENTS

2004/0057768 A1    3/2004 Oshino et al.
2009/0244164 A1*  10/2009 Nakamaki ............ B41J 2/16579
                                                                     347/19
2020/0241816 A1*   7/2020 Miyazaki .............. G06F 3/1234

FOREIGN PATENT DOCUMENTS

| JP | H04-78551 A    | 3/1992 |
| JP | 2004-160981 A  | 6/2004 |
| JP | 2014-144627 A  | 8/2014 |
| JP | 2020-116898 A  | 8/2020 |
| JP | 2020-138496 A  | 9/2020 |

* cited by examiner

*Primary Examiner* — Jamares Q Washington
(74) *Attorney, Agent, or Firm* — KENEALY VAIDYA LLP

(57) ABSTRACT

A printer has a print engine to print images represented by a series of print data on the plurality of printing areas one by one. When an image printed on the printing area is determined to be a low quality image, the controller stops printing and reprint an image corresponding to the low quality image and images corresponding to discard-target images which are being printed or having been printed on the printing areas located upstream in the feeding direction with respect to the printing area on which the NG image has been printed on a new printing area located upstream in the feeding direction with respect to a printing position of the print engine in an order of the print data. The particular image printer is configured to overprint the particular image on the printing area on which the NG image or the discard-target image is printed.

9 Claims, 5 Drawing Sheets

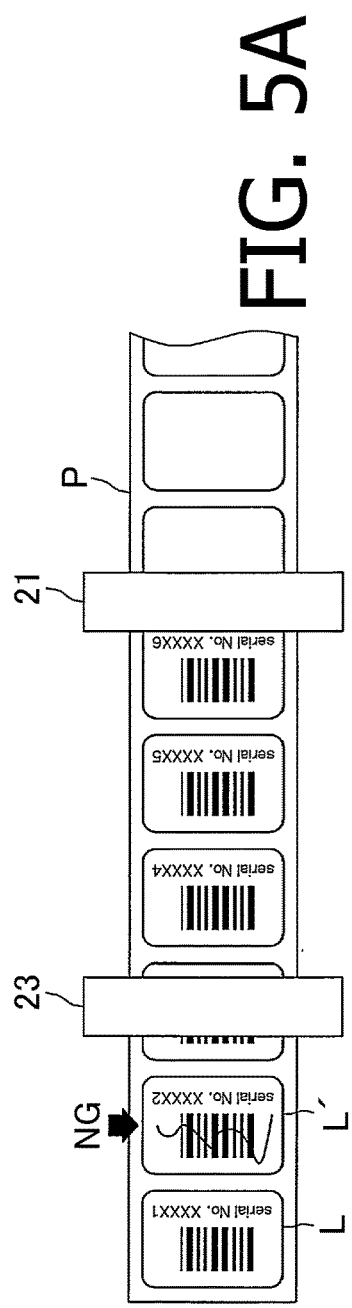
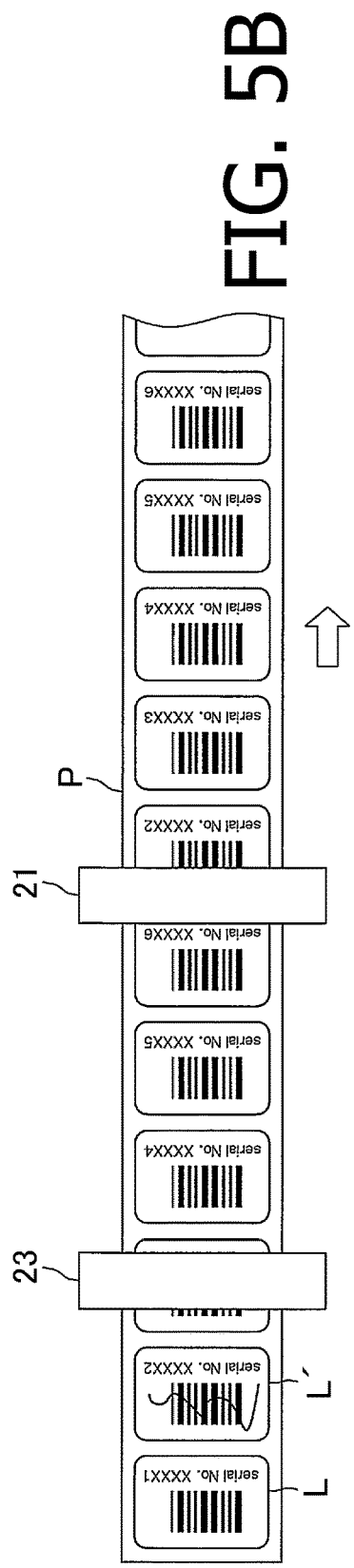
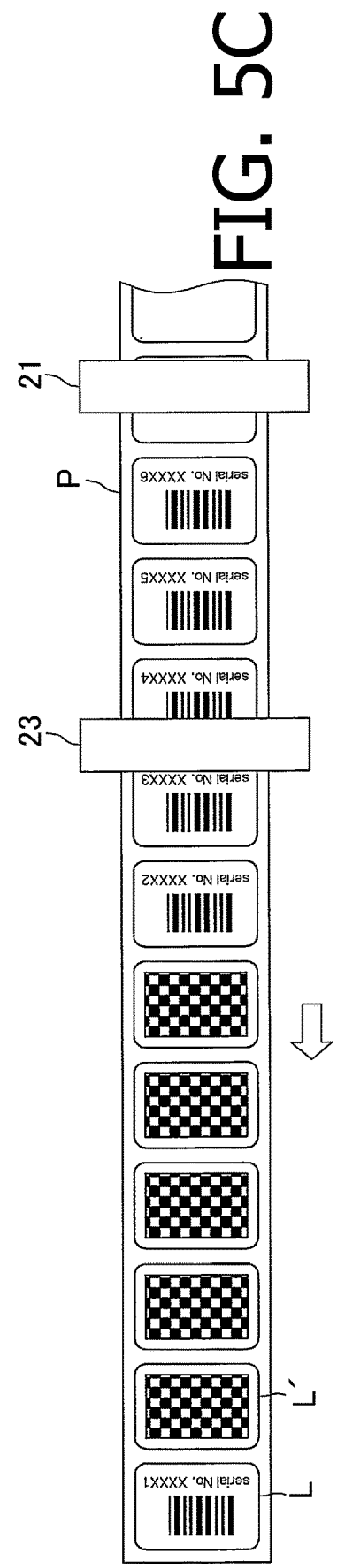

PRINTER AND PRINTING SYSTEM FOR REPRINTING LOW QUALITY IMAGE AND MARKING DISCARD IMAGES

CROSS-REFERENCE TO RELATED APPLICATIONS

This application claims priority under 35 U.S.C. § 119 from Japanese Patent Application No. 2021-061651 filed on Mar. 31, 2021. The entire subject matter of the application is incorporated herein by reference.

BACKGROUND

The present disclosures relate to a printer and a printing system.

Conventionally, as one type of printers, there have been known printers configured to use a roll of long continuous sheet and a plurality of labels (i.e., printing areas) are provided on the continuous sheet (i.e., a mount) such that the plurality of labels are aligned in the longitudinal direction of the continuous sheet P.

Among such printers, there is known a printer which is provided with a scanner configured to scan an image printed on the label, and the print result is evaluated, based on the image data representing the scanned image, whether the print result is good or bad. When the print result is evaluated to be bad, the continuous sheet is rewound and a mark indicating invalidity is overprinted on the label (i.e., the image) which is evaluated to be bad in order to notify the user of the bad print result. Thereafter, the continuous sheet is fed forward again and the image having been evaluated to be bad is reprinted on another label on the continuous sheet.

SUMMARY

It is assumed that the printer as described above is configured such that serial numbers are printed together with the image on the labels in numerical order. At the time when the printing result of the image including a serial number "N" (N: an integer of 1 or larger) is evaluated to be defective, on the labels located between the scanner and a print head, images have already been printed with the serial numbers "N+1" onwards. Therefore, after the invalid mark is printed on the label on which the image including the serial number "N" is printed, if the continuous sheet is fed until a blank label (i.e., a label on which no image is printed) reaches the printing position of the print head, and the image including the serial number "N" is reprinted on the blank label, the serial numbers printed on the labels are no longer sequentially numbered from the downstream side of the feeding direction of the continuous sheet, and it becomes difficult for the user to find the label on which the image including the serial number "N" is printed.

According to aspects of the present disclosures, there is provided a printer, which is provided with a conveyor configured to convey a continuous sheet, on which a plurality of printing areas are aligned, in an aligning direction of the plurality of printing areas, a print engine configured to perform printing to print a plurality of images on the plurality of printing areas of the continuous sheet conveyed by the conveyer in a feeding direction along the aligning direction, and a controller. The controller is configured to perform causing the print engine to perform a serial printing to print a plurality of images represented by a series of print data on the plurality of printing areas one by one. When an image printed on the printing area is read by an image reader provided downstream in the feeding direction with respect to the print engine and a print result determined based on image data representing image read by the image reader does not satisfy a standard quality, the controller is configured to cause the print engine to stop the serial printing and perform reprinting an image represented by print data corresponding to a low quality image of which print result does not satisfy the standard quality and an image represented by print data corresponding to a discard-target image which is being printed or having been printed on the printing area located upstream in the feeding direction with respect to the printing area on which the low quality image has been printed on a new printing area located upstream in the feeding direction with respect to a printing position of the print engine in an order of the series of print data. The print engine is configured to overprint the particular image on the printing area on which the low quality image or the discard-target image is printed.

According to aspects of the present disclosures, there is provided a printing system, which is provided with a printer and a particular image printer configured to print a particular image. The printer includes a conveyor configured to convey a continuous sheet, on which a plurality of printing areas are aligned, in a aligning direction of the plurality of printing areas, a print engine configured to perform printing to print a plurality of images on the printing areas of the continuous sheet conveyed by the conveyer in feeding direction along the aligning direction, and a controller having hardware. The controller is configured to perform causing the print engine to perform a serial printing to print images represented by a series of print data on the plurality of printing areas one by one. When an image printed on the printing area is read by an image reader provided downstream in the feeding direction with respect to the print engine and a print result determined based on image data representing image read by the image reader does not satisfy a standard quality, the controller is configured to cause the print engine to stop the serial printing and perform reprinting an image represented by print data corresponding to a low quality image of which print result does not satisfy the standard quality and an image represented by print data corresponding to a discard-target image which is being printed or having been printed on the printing area located upstream in the feeding direction with respect to the printing area on which the low quality image has been printed on a new printing area located upstream in the feeding direction with respect to a printing position of the print engine in an order of the series of print data. The particular image printer is configured to overprint the particular image on the printing area on which the low quality image and the discard-target image are printed.

According to aspects of the present disclosures, there is provided a conveyor configured to convey a continuous sheet, on which a plurality of printing areas are aligned, in an aligning direction of the plurality of printing areas, a print engine configured to perform printing to print a plurality of images on the plurality of printing areas of the continuous sheet conveyed by the conveyer in a feeding direction along the aligning direction, and a controller configured to perform causing the print engine to perform a serial printing to print a plurality of images respectively represented by a series of print data on the plurality of printing areas one by one, causing an image reader arranged downstream in the feeding direction with respect to the print engine to read an image printed on one of the plurality of printing areas, determining whether image data representing the image read by the image reader satisfies a standard quality, or the image being determined to be a low quality image when the image does not satisfy the standard quality. When the image is determined to be the low quality image, the controller is configured to cause the print engine to stop the serial printing and perform reprinting an image represented by print data corresponding to the low quality image and an image represented by print data corresponding to a discard-target image which is being printed or having been printed on the printing area located upstream in the feeding direction with respect to the printing area on which the low quality image has been printed on a new printing area located upstream in the feeding direction with respect to a printing position of the print engine in an order of the series of print data. The controller is further configured to cause the print engine to overprint a particular image on the printing areas on which the low quality image and the discard-target image have been printed.

According to the above configurations, images pertaining to a plurality of pieces of print data are printed in the print areas, respectively. When some of the printed images are determined to have print results which do not meet the standard, the images are reprinted with maintaining the print order of the entire images pertaining to the plurality of pieces of print data.

BRIEF DESCRIPTION OF THE DRAWINGS

FIG. 5A shows a state where printing of print data of a sixth page has been completed.

FIG. 5B shows a state where the continuous sheet is being conveyed in a pull-back direction for VOID printing.

FIG. 5C shows a state where the VOID printing has been performed.

DETAILED DESCRIPTION

Hereinafter, an embodiment according to the present disclosures will be described in detail with reference to the accompanying drawings.

Overall Configuration of Label Printer

Figure 1:
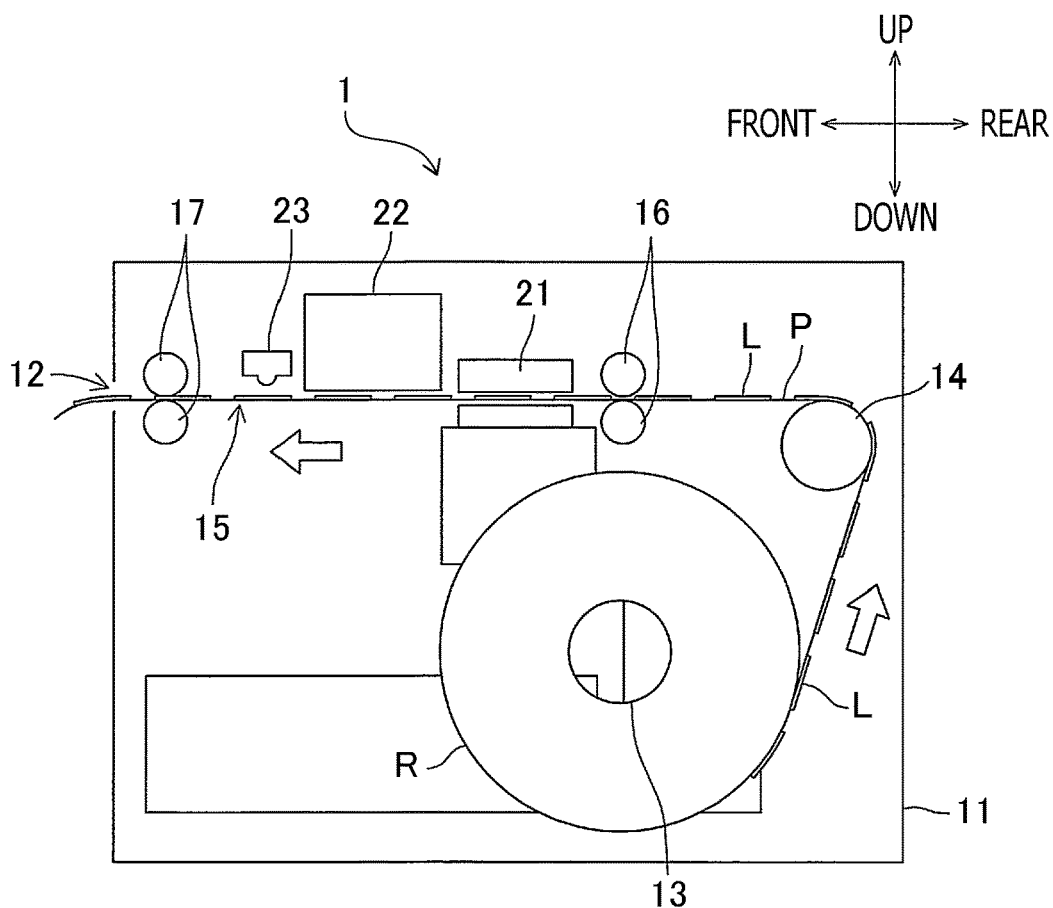
FIG. 1 is a cross-sectional side view schematically showing a configuration of a label printer.

A label printer 1 is a device configured to print images on a long continuous sheet P, as shown in FIG. 1. A portion of the continuous sheet P on which images have been printed is discharged from a discharge port 12 defined on a side wall of a housing 11 which forms an outer shell of the label printer 1.

In the following description, front and rear sides of the label printer 1 are defined such that a side on which the discharge port 12 is formed is referred to as the front side of the label printer 1 (i.e., a left-hand side of FIG. 1), and an opposite side of the label printer 1 (i.e., a right-hand side in FIG. 1) is referred to as the rear side of the label printer 1. Further, a left side and a right side of the label printer 1 when viewed from the front side are defined as the left and right sides of the label printer 1, respectively. In addition, up and down sides of the label printer 1 are defined in terms of a state in which the label printer 1 is installed on a horizontal surface. FIG. 1 shows a cross-sectional side view of the label printer 1 which is a view along a cutting plane cut by a plane extending in the front-rear and up-down directions, viewed from the right side of the label printer 1.

The continuous sheet P may be a die-cut label sheet on which labels L (an example of a printing area) are adhered on a long mount with being aligned in the longitudinal direction of the label sheet, or an indefinite length sheet (i.e., a continuous sheet) on which base images respectively defining printing areas at certain intervals are printed in advance on a printing surface of a long plain sheet. Alternatively, the continuous sheet may be an indefinite length sheet on which no such base images have been printed. In the die-cut label sheet, a printing surface, which is opposite to the adhesive surface, of each label L is a printing area. In the following description, a case where the continuous sheet P is the die-cut label sheet will be taken as an example.

The discharge port 12 is a rectangular opening extending in a right-left direction and communicating between the inside and outside of the housing 11.

A roll holder 13 is provided in the housing 11 to hold the continuous sheet P in a state of a roll R. The continuous sheet P is wound around a roll core with the printing surface facing outward. The roll holder 13 has a substantially cylindrical shape, and the roll R is held in the roll holder 13 as the roll core is fitted onto the roll holder 13.

In the housing 11, a direction change roller 14 is provided on an upper-rear side with respect to the roll holder 13. A conveyance path 15, through which the continuous sheet P is conveyed, is defined frontward with respect to the direction change roller 14. The conveyance path 15 extends frontward from a position above the direction change roller 14, and a front end of the conveyance path 15 is connected to the discharge port 12. The continuous sheet P is drawn from the roll R toward a rear side of the direction change roller 14, the extending direction of the continuous sheet P is changed frontward with following on a circumference of the direction change roller 14, and is directed frontward, or toward the discharge port 12 through the conveyance path 15.

A conveyance roller pair 16 (which is an example of a conveyer) is provided on the conveyance path 15 to convey the continuous sheet P. The conveyance roller pair 16 is arranged on the front side, at a certain interval, with respect to the direction change roller 14. In addition, another conveyance roller pair 17 (which is also an example of the conveyer) is arranged on a rear side with respect to the discharge port 12 and on a front side, at a certain interval, with respect to the conveyance roller pair 16.

When a motor M (see FIG. 2) is actuated and a forward rotational force of the motor M is transmitted to the conveyance roller pair 16 with the continuous sheet P being passed through between rollers of the conveyance roller pair 16, the rollers of the conveyance roller pair 16 rotate and the continuous sheet P is conveyed in a feeding direction in which the continuous sheet P is conveyed, along the conveyance path 15, toward the discharge port 12. A transmission path of the driving force of the motor M is also connected to the roll holder 13 (which is an example of the conveying mechanism). When a reverse rotational force of the motor M is transmitted to the roll holder 13, the roll holder 13 is rotated in a direction opposite to the feeding direction of the continuous sheet P. Then, the roll R is rotated in unison with the roll holder 13, and the continuous sheet P is conveyed in a pull-back direction which is a direction opposite to the feeding direction.

At the time of deceleration and/or stopping of the continuous sheet P conveyed by the conveyance roller pair 16, the roll holder 13 is driven to rotate forwardly or reversely by the driving force of the motor M so that an inertia force acting on the roll R is adjusted. The direction change roller 14 is configured to provide tension to the continuous sheet P between the roll holder 13 and the conveyance roller pair 16. A mechanism for detecting the magnitude of the tension of the continuous sheet P is provided in conjunction with the direction changing roller 14.

Between the conveyance roller pairs 16 and 17, a print head 21 (which is an example of a printing engine), a heater 22, and a CIS (Contact Image Sensor) 23 (which is an example of a scanning device) are arranged along the feeding direction in this order.

The print head 21 is arranged to face the conveyance path 15 from above. The print head 21 is configured to print an image, for example, in accordance with an inkjet recording method, on the printing surface of the continuous sheet P which is conveyed along the conveyance path 15. It is noted that a printing position at which printing is performed by the print head 21 is defined as a position spaced downstream from an upstream end of the print head 21 in the feeding direction, and also as a position spaced upstream from a downstream end of the print head 21 in the feeding direction. The print head 21 is configured to print an image on the printing surface of the continuous sheet P at the printing position.

The heater 22 is disposed downstream, in the feeding direction, with respect to the print head 21, facing the conveyance path 15 from above. The heater 22 applies heat to the continuous sheet P after an image is printed by the print head 21 to dry and fix the ink on the continuous sheet P.

A CIS unit 23 is disposed downstream with respect to the print head 21 in the feeding direction, facing the transport path 15 from above. The CIS unit 23 is configured to scan the printed surface of the continuous sheet P, which is conveyed in the conveyance path 15. Concretely, the CIS unit 23 incorporates a light source, a rod lens array, and a linear image sensor, which are well-known configurations and not shown in the figure. Line-shaped light is irradiated onto the printing surface of the continuous sheet P from the light source of the CIS unit 23, and the light reflected from the printing surface enters the linear image sensor through the rod lens array. As a result, the document is read for one line in a main scanning direction at a reading position of the CIS unit 23. According to the present embodiment, the linear image sensor has a plurality of image sensors arranged in a row extending in the main scanning direction, and the image data read by each image sensor is image data (pixel value) for one pixel. It is noted that the main scanning direction is a direction orthogonal to the feeding direction (pull-back direction) of the continuous sheet P in the conveyance path 15 and parallel a width direction of the continuous sheet P which is being conveyed along the conveyance path 15.

Main Part of Electrical Configuration

Figure 2:
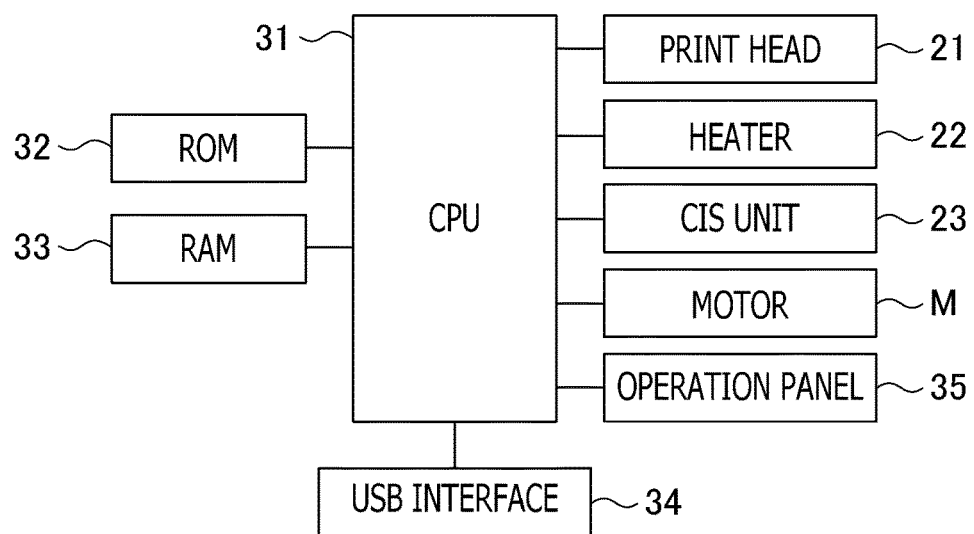
FIG. 2 is a block diagram showing a main part of an electrical configuration of the label printer shown in FIG. 1.

As shown in FIG. 2, the label printer 1 has a CPU (Central Processing Unit) 31, a ROM (Read Only Memory) 32 and a RAM (Random Access Memory) 33.

The CPU 31 (which is an example of a controller) is configured to execute a program for various processes to control the print head 21, the heater 22, the CIS unit 23, and the motor M.

The ROM 32 is a rewritable non-volatile memory such as a flash memory. In the ROM 32, a program to be executed by the CPU 31 and various data and the like are stored.

The RAM 33 is a volatile memory such as a DRAM (Dynamic Random Access Memory or other volatile memory, and is used as a work area when the CPU 31 executes programs.

An encoder is provided in conjunction with the motor M, and the CPU 31 is configured to receive an encoder signal, which is a pulse signal generated by the encoder synchronously with the rotation of the motor M. The RAM 33 is used by the CPU 31 as a step counter for counting the number of steps (i.e., the pulses of the pulse signal). The CPU 31 counts the number of pulses of the encoder signals input from the encoder during a forward drive of the motor M and the number of pulses of the encoder signals input from the encoder during a reverse drive of the motor M with use of the step counter, respectively, and the CPU 31 grasps the location of the continuous sheet P based on the thus obtained step numbers.

A USB interface 34 is an interface for performing data communication with a USB device such as a USB memory. The USB interface 34 has a USB connector to which a USB cable is connected, and a USB controller to control the USB connection with the USB device.

The label printer 1 is further provided with an operation panel 35. The operation panel 35 includes an operation part to be operated by a user for various settings, and a display part for displaying information. The operation part and the display part may be provided separately, or may be in the form of a touch panel having an operation part such as a pressure-sensitive or capacitance-type transparent film switch overlaid on the display part such as a liquid crystal display.

Print Process

When printing is executed by the label printer 1, for example, a USB memory storing the print data is connected to the USB interface 34 (e.g., a USB connector). Then, in response to the user pressing a print start button provided on the operation panel 35, printing of an image represented by the print data stored in the USB memory is instructed. The print data is data representing information such as positions of characters, character types, and positions of figures in an image to be printed, which are described in a page description language.

Figure 3:
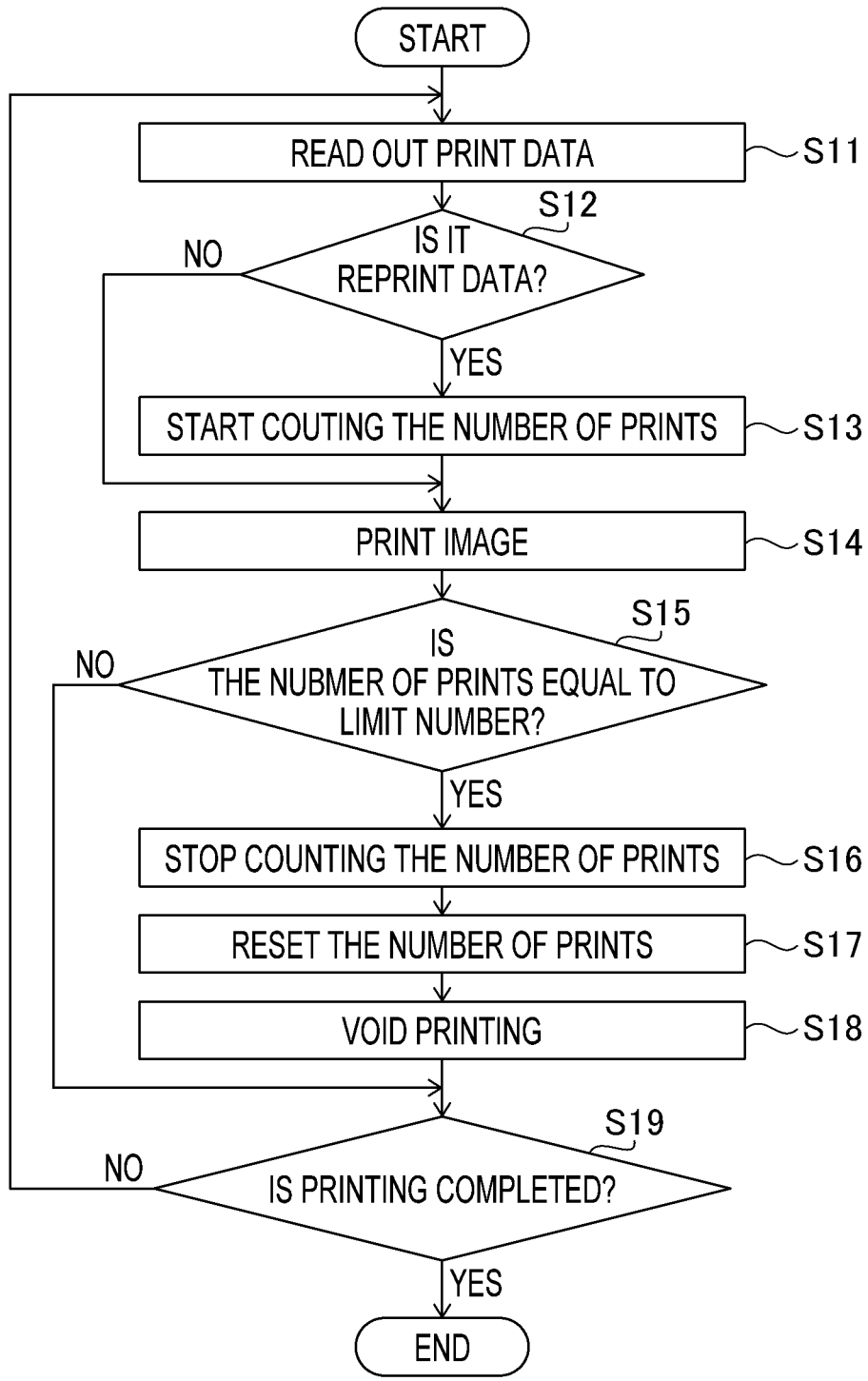
FIG. 3 is a flowchart illustrating a printing process performed by the label printer shown in FIG. 1.

When printing is instructed, the CPU 31 starts a printing process shown in FIG. 3.

In the printing process, the CPU 31 reads out all print data representing images to be printed from the USB memory and temporarily stores the same into the RAM 33 as a series of print data arranged in page order from a first page. Then, in response to the start of the printing operation, the CPU 31 reads out print data of the first page from the RAM 33 (S11). In addition, the CPU 31 drives the motor M to rotate forward. With the forward rotation of the motor M, the conveyance roller pairs 16 and 17 rotate, thereby the continuous sheet P being conveyed along the conveyance path 15 in the feeding direction.

In an inspection process described below, when the print result of the image printed on the label L is determined to be "NG," print data corresponding to the image of which print result is determined to be "NG" (hereinafter, such an image will be referred to as an NG-print image or a low quality image) and print data corresponding to an image (hereinafter referred to as the "discard-target image") that is being printed or has been printed on a label L located upstream, in the feeding direction, with respect to the NG label L' on which the NG-print image has been printed, are inserted at a top of the unprinted image data as reprint data. The CPU 31 determines whether or not the print data read from the RAM 33 is the reprint data (S12).

When the CPU 31 determines that the print data read from the RAM 33 is the reprint data (S12: YES), the CPU 31 starts counting the number of print data to be printed thereafter (hereinafter referred to as the "number of prints") (S13). When counting of the number of prints has already been started, the counting of the number of prints is not started anew, but the counting that has already been started is continued. Then, the CPU 31 controls the print head 21 to execute printing images represented by the print data read from the RAM 33 on the labels L (S14).

On the other hand, when the CPU 31 determines that the print data read from the RAM 33 is not the reprint data (S12: NO), the CPU 31 controls the print head 21 to print images represented by the print data read from the RAM 33 on the labels L (S14) without starting to count the number of prints. Regarding print data representing the first page, since the print data representing the first page cannot be the reprint data, the CPU 31 determines that the print data for the first page is not the reprint data, and executes printing of images represented by the print data (S14).

In a state where the counting of the number of prints has been started, when an image represented by the print data read from the RAM 33 is printed on the label L, the CPU 31 increments the count of the number of prints by one. When the count of the number of prints has not been started, even if the image represented by the print data read from the RAM 33 is printed on the label L, the CPU 31 does not increment the count of the number of prints. When the image represented by the print data read from the RAM 33 has been printed, the CPU 31 checks whether the number of prints has reached a particular limit number (S15).

The limit number is set to the number of the labels L arranged on a portion of the continuous sheet P having a length corresponding to the minimum value of the conveyance amount, in the pull-back direction, of the continuous sheet P until the back side of the continuous sheet P contacts the printed surface of the printed label L when the continuous sheet P is rewound on the roll R. In other words, the limit number is set to the number of labels L arranged on a portion of the continuous sheet P having a length which is the sum of a distance, along the continuous sheet P, between the printing position of the print head 21 and the position of the roll R, and the minimum circumference of the roll R (i.e., a circumference length of the roll holder 13).

When the CPU 31 determines that the count of the number of prints has not reached the limit number (S15: NO), the CPU 31 determines whether the printing of images represented by all the print data to be printed has been completed (S19). When the printing of the images represented by all the print data has not been completed (S19: NO), the CPU 31 reads out the print data for the next page from the USB memory (S11), and controls the print head 21 to print the image represented by the print data for the next page (S14).

As the printing of the images of the print data proceeds, the reprint data is read out from the RAM 33 (S12: YES), the counting of the number of prints is started (S13), and the printing of the images represented by the print data is performed (S14). When the count of the number of prints reaches the limit number (S15: YES), the CPU 31 stops counting the number of prints (S16) and resets the count value of the number of prints to 0 (S17). Then, the CPU 31 controls the motor M and the print head 21 to execute a VOID printing (S18).

In the VOID printing, the CPU 31 stops the forward rotation of the motor M and then controls the motor M to reversely rotate by a particular amount. The particular amount is set to an amount by which the downstream end, in the feeding direction, of the label L on which an NG-print image pertaining to the reprint data read out from the RAM 33 at the start of the counting of the number of prints (hereinafter, a label L on which the NG-print image is printed is referred to as an "NG label L'") moves to a position coinciding with or upstream with respect to the print position of the print head 21. This causes the continuous sheet P to be conveyed in the pull-back direction until the most upstream NG label L' on which the VOID image has not been printed reaches a position coinciding with or upstream with respect to the printing position of the print head 21. Thereafter, the CPU 31 stops the motor M once and then rotates forward. The forward rotation of the motor M causes the continuous sheet P to be conveyed again in the feeding direction. Then, the CPU 31 controls the print head 21 so that the VOID image is overprinted on the NG-print image of each NG label L' and each discard-target image located upstream thereof.

After completion of the VOID printing, the CPU 31 determines whether printing of the images represented by all the print data to be printed has been completed (S19). When the printing of the images for all the print data has not been completed (S19: NO), the CPU 31 reads out the print data for the next page from the USB memory (S11), and controls the print head 21 to print the image represented by the print data for the next page (S14).

As the printing of the images represented by the print data for each page proceeds, and when the CPU 31 determines that the printing of the images represented by all the print data has been completed (S19: YES), the CPU 31 terminates the printing process.

Inspection Process

Figure 4:
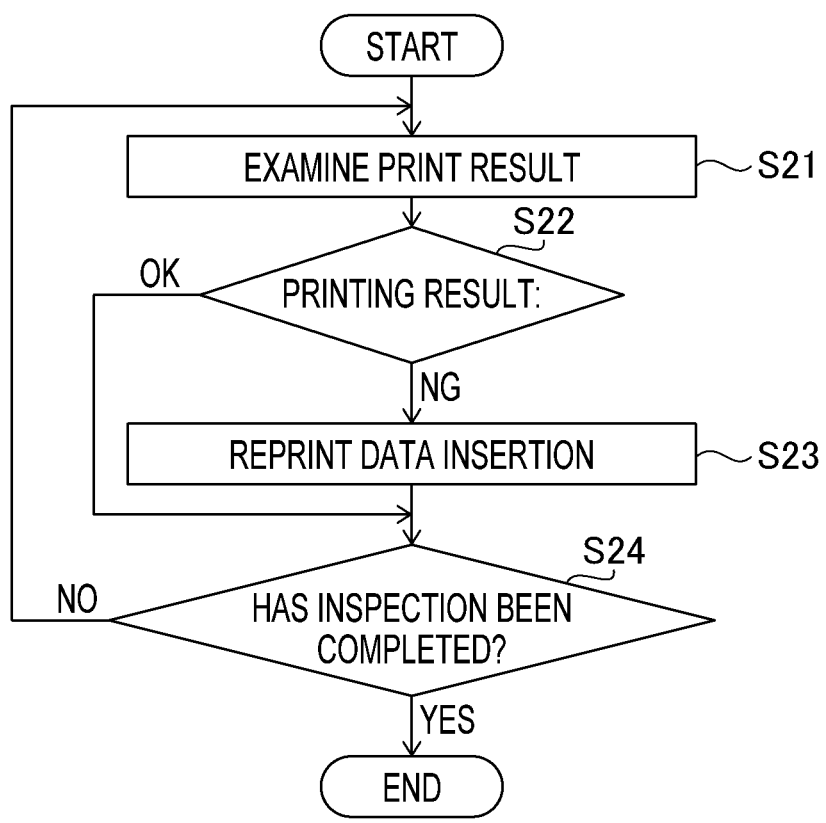
FIG. 4 is a flowchart illustrating an inspection process performed by the label printer shown in FIG. 1.

The CPU 31 starts the inspection process shown in FIG. 4 in response to the start of printing of the images on the labels L.

In the inspection process, the CPU 31 examines the print result, in order, from the image represented by the print data for the first page (S21). Concretely, at a timing when the label L on which the image represented by the print data for the first page is printed is approaching the reading position of the CIS unit 23, the CPU 31 controls the CIS unit 23 to read the image printed on the label L. Then, based on the data (i.e., read data) representing the image read by the CIS unit 23, the CPU 31 determines whether the print result of the image is "OK" meaning that the print result satisfies a particular standard or "NG" meaning that the print result does not satisfy the particular standard. When, for example, the image includes a barcode symbol, the CPU 31 determines, from the read data, the optical characteristics (e.g., reflectance, reflective density, PCS (Print Contrast Signal) value, and the like) of the barcode symbol satisfies the JIS (Japanese Industrial Standards). When the CPU 31 determines that the optical characteristics of the barcode symbol satisfies the JIS standard, the CPU 31 determines that the printing result of the image containing the barcode symbol is "OK," while when the optical characteristics of the barcode symbol do not satisfy the JIS standard, the CPU 31 determines that the printing result of the image including the barcode symbol is "NG."

When the CPU 31 has not determined that the printing result of the image on the label L is "NG", that is, when the CPU 31 has determined that the printing result is "OK" (S22: YES), the CPU 31 determines whether the inspection of the images represented by all the print data printed on the label L by the printing process has been completed (S24).

On the other hand, when the CPU 31 determines that the printing result of the image on the label L is "NG" (S22: NG), the CPU 31 inserts reprint data at the top of the unprinted print data (S23) so that the reprint data is read before the unprinted print data from the RAM 33 in the page order, the reprint data being print data corresponding to a discard-target image of which printing result is determined to be "NG" and print data corresponding to discard-target image being printed or having been printed on the label L located upstream, in the feeding direction, with respect to the NG label L' on which the device image has been printed. Thereafter, the CPU 31 determines whether the inspection of the images represented by all the data having been printed on the labels L in the print process has been completed (S24).

As the determination of the print result proceeds, and when the CPU 31 determines that the inspection of the images represented by all the print data has been completed (S24: YES), the CPU 31 terminates the printing process.

Operation of Label Printer

Figure 6:
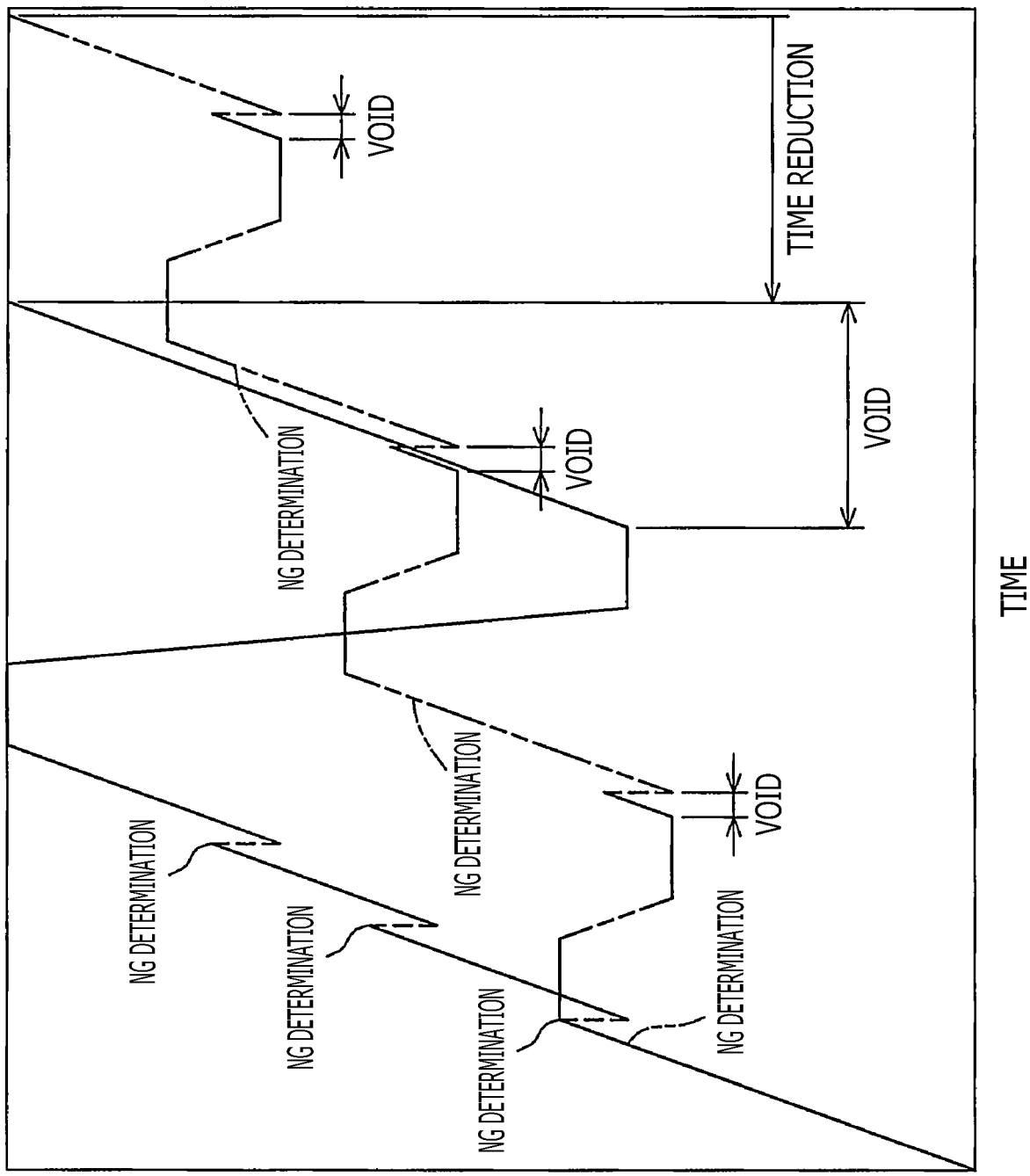
FIG. 6 shows a relationship between an elapsed time and the number of prints in each of cases where the VOID printing is performed at every NG evaluation of the printed image and where the VOID printing is performed collectively.

As the printing process and the inspection process are performed, the label printer 1 operates, for example, as illustrated in FIGS. 5A, 5B and 6. The operations illustrated in FIGS. 5A, 5B and 6 show an example when the print target is print data representing 6 pages of images, the limit number is 7 or more, and the print result of the image of the print data representing the second page is "NG."

As shown in FIG. 5A, it is assumed that, at the time when the print result of the image represented by the print data for the second page is determined to be "NG," the image represented by the print data for the sixth page is being printed on the label L, and a label L adjacent to the 6th-page label L upstream in the feeding direction is a blank label L on which an image represented by the print data is not formed. When the print result of the image represented by the print data for the second page is determined to be "NG," the print data corresponding to the NG-print image of which printing result is determined to be "NG" and the print data corresponding to the images to be discarded that are being printed or have been printed on a labels L located upstream in the feeding direction with respect to the NG label L' on which the NG-print image was printed, that is, the print data for the second through sixth pages is determined to be the reprint data. At this time, since printing of the print data for the sixth page has already been completed and there is no unprinted print data, the print data for the second through sixth pages is newly store in the RAM 33 so that the print data for the second through sixth pages is read from the RAM 33 in this order.

Thereafter, the print data for the second page through sixth page is read out from the RAM 33 in this order, and the images represented by the print data for the second page to the sixth page 6 is reprinted on the blank label L adjacent upstream in the feeding direction with respect to the label L on which the discard-target image is printed and the blank labels L arranged upstream in the feeding direction.

After reprinting the images represented by the print data for the second through sixth pages, the NG label L' on which the NG-print image, which is the image represented by the print data for the second page, is printed is pulled back to the position where printing by the print head 21 is possible, as shown in FIG. 5B. Then, as shown in FIG. 5C, the VOID images are overprinted on the NG-print image of the NG label L' and the discard-target image printed on the label L upstream in the feeding direction with respect to the NG label L'. The VOID image is preferably a pattern, such as a black-and-white grid, that makes the NG-print image and the discard-target image to be unrecognizable.

The image represented by the print data for the second page, which was determined to be the NG-print image, is reprinted on the label L adjacent upstream in the feeding direction with respect to the label L on which the image represented by the print data for the sixth page has been printed, and images represented by the print data for the seventh and subsequent pages are printed on the labels L upstream in the feeding direction with respect to the label L on which the NG-print image has been reprinted.

When the print target is the print data representing a total of seven or more pages, after the images represented by the print data for the second through sixth pages, that is, the NG-print image and the discard-target images are reprinted, the images represented by the print data for seventh and subsequent pages are printed without performing the VOID printing. It is noted, however, when the limit number is 6 or less, the VOID printing is performed after the reprinting of the NG-print image and the discard-target images, and the printing of the images represented by the print data for new pages is performed after the VOID printing (see S18 of FIG. 3).

Effects

As described above, while the continuous sheet P is conveyed in the feeding direction, a series of multiple images represented by the print data are printed on one labels L one by one in order. In parallel with printing of the series of images (i.e., a serial printing), the CIS unit 23 arranged downstream in the feeding direction with respect to the print head 21 reads the images on the labels L. Then, when the printing result determined from the image data representing the image read by the CIS unit 23 does not meet the standard, i.e., the determination result is "NG," not only the image represented by the print data corresponding to the NG-print image that does not meet the standard, but also the images represented by the print data corresponding to the discard-target images that are located upstream in the feeding direction with respect to the NG-print image and are being printed or have been printed are printed on new labels L in the order of the print data (i.e., in the order of the pages). In addition, the VOID image is overprinted on the NG label L' on which the NG-print image is printed and the labels L on which the discard-target images are printed. Accordingly, the NG-print image and the discard-target images are no longer images pertaining to the print data. As a result, the labels L on which the images represented by the print data are printed can be obtained in the order of the print data (i.e., in the order of the pages).

After the images represented by the print data corresponding to the NG-print image and the discard-target images are reprinted, the VOID image is printed on the labels L on which the NG-print image and the discard-target images were overprinted. Therefore, when a plurality of print results are determined to be "NG" before the number of print results reaches the limit number, the images represented by the print data corresponding to the NG-print images for which the print results are determined to be "NG and the discard-target images upstream in the feeding direction for each NG-print image, the VOID image is overprinted collectively on the labels L determined to be the NG-print images and the discard-target images. As a result, it is not necessary to convey the continuous sheet P upstream in the pull-back direction for overprinting the VOID image every time an NG-print image that does not meet the printing result standard is detected, thereby the efficiency of printing being improved.

As shown by double-dotted lines in FIG. 6, for example, when the reprinting of the images represented by the print data corresponding to the NG-print images and the discard-target images, and the VOID printing are performed on the NG-print images and the discard-target images every time when the print results of three images are determined to be "NG" (NG determination is made) before the number of prints reaches the limit number, halting of the conveyance of the continuous sheet P, executing the conveyance in the pull-back direction, halting the same, and executing the conveyance in the feeding direction are performed every time when the VOID printing is performed, it takes time until the images of the limited number (e.g., the total number of pages represented by the print data when the limited number is larger than the total number of pages represented by the print data) are obtained in the order of the page.

In contrast, as shown by solid lines in FIG. 6, when the VOID printing is performed collectively, the stopping of the conveyance of the continuous sheet P, halting of the conveyance of the continuous sheet P, executing the conveyance in the pull-back direction, halting the same, and executing the conveyance in the feeding direction can be performed only once. In addition, the conveyance speed in the pull-back direction can be made faster compared to the conveyance speed in the feeding direction. Accordingly, the time until the limited number of images are obtained in the order of pages represented by the print data can be shortened compared to a case where the VOID printing is performed each time the NG determination is made.

The limited number is set to the number of labels L that are arranged on a portion of the continuous sheet P having a length corresponding to a minimum value of the conveyance amount in the pull-back direction of the continuous sheet P until the back side of the continuous sheet P contacts the printed surface of a printed label L when the continuous sheet P is rewound onto the roll R. Therefore, even when the continuous sheet P is rewound onto the roll R for executing the VOID printing, the continuous sheet P is not overlaid on the labels L on which the images have been printed. Accordingly, even if the image (ink) printed on the printing surface is not dry, an occurrence of transferring of the ink (image) from the label L to the back surface of the continuous sheet P or staining of the printing surface with ink can be suppressed.

Since the image represented by the print data corresponding to the NG-print image is reprinted on a new label L adjacent to the label L that is located most upstream in the feeding direction among the labels L on which the discard-target images were printed, it is possible to suppress the generation of blank labels between the label L on which the discard-target image is printed and the label L on which the image represented by the print data corresponding to the NG-print image is reprinted. As a result, the waste of labels L can be suppressed and the running cost of the label printer 1 can be reduced.

Since the VOID image is overprinted on the discard-target images when the print result of an image is determined to be "NG," for the images that have already been printed on the labels upstream in the feeding direction with respect to the NG-print image for which the print result is determined to be "NG," in the inspecting process, the determination of the print result may be skipped in the inspecting process. This can eliminate the waste of the CIS unit 23 reading the discard-target images which are scheduled to be reprinted. In the inspection process, when the print result of an image is determined to be "NG," the VOID image is overprinted on the images upstream in the feed direction with respect to the image of which print result is determined to be "NG" and images have been printed, the determination of the print result may be skipped. This eliminates the waste of the CIS unit 23 reading the discard-target images that are scheduled to be reprinted.

Modifications

The above description describes an embodiment according to the present disclosures. It is noted, however, the configuration described above can be implemented as other embodiments.

For example, when the print result of the image reprinted on the label L is again "NG," the VOID image may be overprinted again on the NG-print image, and the NG-print image may be reprinted again on a new label L.

FIG. 5C shows an example in which the VOID image is printed so that the VOID image overlaps the entire NG-print images and the discard-target images. The configuration may be modified such that, the VOID image may be printed to partially overlap each of the NG-print images and the discard-target images. For example, the VOID image may be printed to overlap a specific portion (e.g., a portion where a barcode is indicated in the NG-print image) in order to disable reading of the specific portion of the NG-print image.

Optionally, an image inspecting device provided with a controller (including a CPU) having functions same as those regarding the inspecting process of the CIS unit 23 and the CPU 31 may be externally equipped to the label printer 1. In addition, the functions related to the inspection process realized by the CIS unit 23 and the CPU 31 may optionally be equipped to a label printer that does not have such functions.

The printing of the VOID image may not be performed by the print head 21, but by a VOID image printer that is externally provided to the label printer 1. That is, the continuous sheet P discharged from the discharge port 12 of the label printer 1 may be received by such a VOID image printer, and the VOID image may be overprinted, by a print head provided to the VOID image printer, on the labels L on each of which the NG-print image or the discard-target image is printed.

In the above-described embodiment, it is assumed that the CPU 31 executes each process. However, a plurality of CPUs may be provided in the label printer 1, and the plurality of CPUs may cooperate to execute each process.

Various other design changes can be made to the aforementioned configurations within aspects of the present disclosures.

What is claimed is:

1. A printer, comprising:
a conveyer configured to convey a continuous sheet, on which a plurality of printing areas are aligned, in an aligning direction of the plurality of printing areas;
a print engine configured to perform printing to print a plurality of images on the plurality of printing areas of the continuous sheet conveyed by the conveyer in a feeding direction along the aligning direction; and
a controller configured to perform:
    causing the print engine to perform a serial printing to print a plurality of images represented by a series of print data on the plurality of printing areas one by one;

when a low quality image of the plurality of images is printed on the printing area and read by an image reader arranged downstream in the feeding direction with respect to the print engine and a print result determined based on image data representing the low quality image read by the image reader does not satisfy a standard quality, causing the print engine to stop the serial printing and perform reprinting of a plurality of reprint images that includes
  a second image represented by print data corresponding to the low quality image of which print result does not satisfy the standard quality, and
  a plurality of sequential images represented by print data corresponding to a plurality of discard-target images that are on the printing areas located upstream in the feeding direction between the printing area on which the low quality image has been printed and the printing position;
wherein the second image and each of the plurality of sequential images are printed on respective new printing areas located upstream in the feeding direction with respect to the discard-target images in an order of the series of print data; and
wherein the print engine is configured to overprint a particular image on the printing areas on which the low quality image and the discard-target images are printed.

2. The printer according to claim 1,
wherein the controller is configured to perform:
  causing the conveyer to convey the continuous sheet in a reverse direction which is a direction opposite to the feeding direction along the aligning direction until the low quality image reaches an upstream position in the feeding direction with respect to the printing position; and
  causing the print engine to overprint the particular image in the printing areas in which the low quality image and the discard-target image are printed with causing the conveyer to convey the continuous sheet in the feeding direction.

3. The printer according to claim 2,
wherein the controller is configured to perform:
causing the print engine to overprint the particular image in the printing areas in which the low quality image or the discard-target image is printed after the number of printings of images since reprinting of the second image and the sequential images reaches a limit number.

4. The printer according to claim 1,
wherein the controller is configured to perform:
causing the print engine to overprint the particular image in the printing area in which the low quality image and the discard-target image are printed every time when the controller determines that print result determined based on the image data representing the low quality image read by the image reader does not satisfy the standard quality.

5. The printer according to claim 1,
wherein the controller is configured to perform:
causing the print engine to reprint the second image and the sequential images in the respective new printing areas starting in one of the new printing areas that is adjacent to a most upstream printing area located at a most upstream position in the feeding direction among the printing areas in which the discard-target images have been printed.

6. The printer according to claim 1,
wherein the controller is configured to instruct the image reader to skip reading the discard-target image.

7. The printer according to claim 1,
wherein the image reader is incorporated in the printer.

8. A printing system, comprising:
a printer; and
a particular image printer configured to print a particular image,
wherein the printer comprising:
a conveyer configured to convey a continuous sheet, on which a plurality of printing areas are aligned, in an aligning direction of the plurality of printing areas;
a print engine configured to perform printing to print a plurality of images on the printing areas of the continuous sheet conveyed by the conveyer in feeding direction along the aligning direction; and
a controller having hardware,
the controller is configured to perform:
  causing the print engine to perform a serial printing to print images represented by a series of print data on the plurality of printing areas one by one;
  when a low quality image of the plurality of images is printed on the printing area and read by an image reader provided downstream in the feeding direction with respect to the print engine and a print result determined based on image data representing the low quality image read by the image reader does not satisfy a standard quality, causing the print engine to stop the serial printing and perform reprinting of a plurality of reprint images that includes,
    a second image represented by print data corresponding to the low quality image of which print result does not satisfy the standard quality, and
    a plurality of sequential images represented by print data corresponding to a plurality of discard-target images that are on the printing areas located upstream in the feeding direction between the printing area on which the low quality image has been printed and the printing position;
wherein the second image and each of the plurality of sequential images are printed on respective new printing areas located upstream in the feeding direction with respect to the discard-target images in an order of the series of print data; and
wherein the particular image printer is configured to overprint the particular image on the printing area on which the low quality image and the discard-target images are printed.

9. A printer, comprising:
a conveyer configured to convey a continuous sheet, on which a plurality of printing areas are aligned, in an aligning direction of the plurality of printing areas;
a print engine configured to perform printing to print a plurality of images on the plurality of printing areas of the continuous sheet conveyed by the conveyer in a feeding direction along the aligning direction; and
a controller configured to perform:
  causing the print engine to perform a serial printing to print a plurality of images respectively represented by a series of print data on the plurality of printing areas one by one;
  causing an image reader arranged downstream in the feeding direction with respect to the print engine to read an image printed on one of the plurality of printing areas;
  determining whether image data representing the image read by the image reader satisfies a standard quality, or the image being determined to be a low quality image when the image does not satisfy the standard quality;

when the image is determined to be the low quality image, causing the print engine to stop the serial printing and perform reprinting of a plurality of reprint images that includes, a second image represented by print data corresponding to the low quality image, and a plurality of sequential images represented by print data corresponding to a plurality of discard-target images that are on the printing areas located upstream in the feeding direction between the printing area on which the low quality image has been printed and the printing position, the second image and each of the plurality of sequential images are printed on respective new printing areas located upstream in the feeding direction with respect to the discard-target images in an order of the series of print data; and causing the print engine to overprint a particular image on the printing areas on which the low quality image and the discard-target image have been printed.

\* \* \* \* \*